July 16, 1968  N. F. JORDAN ETAL  3,393,033
RADIATION MODULATION CELL UTILIZING A MAGNETIC POLYMER
Filed July 15, 1964

Neal F. Jordan
Robert L. Wilcox
   INVENTORS.

BY *James E. Reed*
   ATTORNEY

United States Patent Office 3,393,033
Patented July 16, 1968

3,393,033
RADIATION MODULATION CELL UTILIZING A MAGNETIC POLYMER
Neal F. Jordan, Tulsa, Okla., and Robert L. Wilcox, Midland, Tex., assignors, by mesne assignments, to Esso Production Research Company, Houston, Tex., a corporation of Delaware
Filed July 15, 1964, Ser. No. 382,782
14 Claims. (Cl. 350—160)

ABSTRACT OF THE DISCLOSURE

A radiation modulation cell including a magnetic polymer sealed within a container through which radiation may pass, a modulating winding having parallel segments extending in front of and behind the container, and a bias winding having parallel segments extending between the modulating winding segments.

---

The present invention relates to apparatus for modulating electromagnetic radiation and is particularly concerned with an improved radiation beam modulation cell.

The modulation of light at frequencies in the audio range and higher is difficult with conventional equipment because of the high voltages required and the small apertures available with Kerr cells, Pöckel cells, Faraday cells and similar devices and the poor performance obtained with photoelastic cells and mechanical apparatus. The difficulties thus encountered can be avoided in part by means of cells containing a polymer whose transmissibility varies as a function of the magnetic flux intensity to which it is subjected. Using Helmholts coils to supply the magnetic field, only moderate voltages are required for the modulation of light and other forms of radiation at frequencies in the audio range. At higher frequencies and in the case of cells having apertures greater than about two centimeters, however, experience has shown that the inductance of the coils employed becomes a limiting factor and that the voltage requirements increase significantly. At frequencies greater than about 10 kilocycles, voltages in the kilovolt range are necessary. The use of such voltages makes portable power sources impractical, calls for special insulation of the coils and auxiliary equipment, and normally precludes the use of transistorized circuits. These limitations have discouraged the use of such cells in signaling systems, control apparatus and other devices which frequently require reasonably large apertures and may have to operate at relatively high frequencies.

The present invention provides an improved radiation beam modulation cell which largely eliminates difficulties encountered with cells available in the past. In accordance with the invention, it has now been found that light and other forms of electromagnetic radiation can readily be modulated through large apertures and at high frequencies without undue voltage requirements by means of a cell containing a thin film of the magnetic polymer about which two sets of conductors are positioned to provide bias and modulating magnetic fields. This type of cell permits the modulation of visible light, infrared light and other forms of radiation through very large apertures at frequencies in the 0 to 100 kilocycle range with low voltages and modest amperages. It results in substantially uniform modulation over the entire aperture. Such cells are economical to construct, are capable of withstanding extremely rough treatment, and can be used over wide range operating conditions. Because of these and other advantages, the cells of the invention represent a significant improvement over devices available in the past.

The nature and objects of the invention can best be understood by the following detailed description of specific cells contructed in accordance therewith and to the accompanying drawing, in which.

Figure 1:
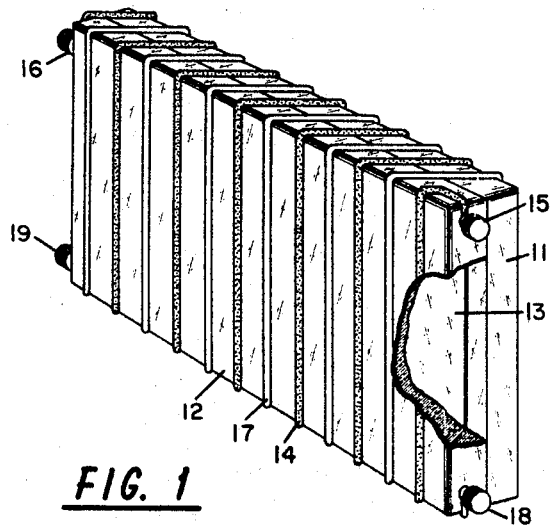
FIGURE 1 is an isometric drawing of one embodiment of the invention showing the use of helical modulating and bias windings.

Before construction of the improved cells of the invention is discussed, the magnetic polymer utilized therein should be described. This polymer is a hydrocarbon polymer or substituted hydrocarbon polymer containing sub-microscopic particles of iron, nickel or cobalt which appear to be tied together by the hydrocarbon molecules to form a metallic chain. Such polymers may be prepared by reacting relatively large quantities of a Group VIII, Series 4, transition metal carbonoyl compound with a carbon-to-carbon ethylenically unsaturated hydrocarbon in a non-oxidizing atmosphere or under non-oxidizing conditions to form an oil-soluble metal carbonyl polymer complex.

The metal carbonyls suitable for purposes of the ininvention are Group VIII transition metal carbonyl compounds of iron, nickel or cobalt, their substituted derivatives, and combinations and mixtures thereof. The carbonyls employed can be in monomeric or polymeric form and may be either substituted or unsubstituted. The stable, unsubstituted carbonyls and the hydrocarbon substituted carbonyls, especially those containing at least two replaceable carbonyl groups, are of particular interest for purposes of the invention. The metal carbonyls employed can be in liquid form, as in the case of $Fe(CO)_5$; in the form of a sublimate vapor, as in the case of $Fe(CO)_5$; or in the form of a solid, as in the case of $Fe_3(CO)_{12}$ and $Fe_2(CO)_9$. Many carbonyls sublime and hence these compounds may be initially employed as a solid and may subsequently, depending upon the reaction conditions, change to a vapor as the reaction progresses.

Metal carbonyl compounds which may be employed for purposes of the invention include those monomeric, dimeric, trimeric and tetrameric carbonyls having from 4 to 12 carbonyl groups, preferably from 4 to 8 carbonyl groups, wherein the carbonyl groups are bonded directly to the metal. Specific examples include iron tetracarbonyl, diiron monocarbonyl, triiron dodecacarbonyl, dicobalt octacarbonyl, tetracobalt dodecacarbonyl, nickel tetracarbonyl, and similar unsubstituted metal carbonyls.

The substituted metal carbonyls which are suitable for purposes of the invention include those carbonyls having one or more substituent groups or electron donating ligands bonded to the metal atoms of the carbonyl compound. The substituent groups may be hydrocarbon groups such as the butadiene, 1,3-octadiene, acetylene, propylene, cyclopentadiene, cyclooctatetraene, $C_1$ to $C_3$ alkyl-substituted cyclopentadiene groups and the like. Examples of suitable substituted carbonyls include 1,3-butadiene-iron tricarbonyl, cyclooctatetraene-iron tricarbonyl, cyclopentadienyl cobalt dicarbonyl, dicyclopentadienyl diiron tetracarbonyl, acetylene dicobalt hexacarbonyl and the like, and combinations thereof. A further class of suitable carbonyl compounds include the neutral and anionic metal carbonyl hydrides in which 1, 2, 3, 4 or more hydrogen atoms, as well as the carbonyl group itself, are bonded directly to the metal or in which a combination of hydrocarbon groups, the carbonyl group and other ligand substituents are bonded directly to the metal along with the hydrogen atoms. Transition metal carbonyls of this type which may be employed for purposes of the invention include the neutral cobalt tetracarbonyl monohydride, $HCo(CO)_4$; the neutral iron tetracarbonyl dihydride, $H_2Fe(CO)_4$; the anionic bis iron octacarbonyl monohydride, $[HFe_2(CO)_8]^-$; the anionic tris iron undecane carbonyl monohydride, $[HFe_3(CO)_{11}]^-$; the anionic iron tetracarbonyl monohydride and the like. Also suitable are the neutral salts of the anionic metal carbonyl hydrides. Suitable basic or neutralizing agents for reaction with the anionic hydrides include the alkali, alkaline earth, and heavy metal oxides and hydroxides; ammonia; amines such as fatty acid amines and alkyl amines; polyamines such as alkylene diamine; hydroxy amines; quaternary ammonium hydroxides; and the like. One example of a suitable neutral salt formed by the reaction of an alkyl amine with the anionic metal carbonyl hydride is

$[C_2H_2NH]^+[HFe_3(CO)_{11}]^-$

Other ligands which may be employed include phosphines such as triphenyl phosphine, arsenes, amines, halides, isonitriles, cyanides and the like. Examples of mixed metal carbonyl hydrocarbon hydrides include cyclopentadienyl iron dicarbonyl hydride and butadiene cobalt carbonyl hydride.

The polymeric materials which are utilized for purposes of the invention may be produced from a variety of unsaturated polymers or elastomers, regardless of the method of polymerization employed to obtain the original starting polymer. The carbonyl-polymer complexes can thus be prepared with unsaturated polymers normally produced with heavy metal-organometal catalysts such as aluminum alkyl-titanium halide systems, including the aluminum triethyl titanium tetrahalide systems referred to as the Ziegler catalyst; with metal alkyl-cobalt salt complex catalyst systems; with alkali metal catalysts such as alkyl lithium or lithium metal catalyst; and with Friedel-Crafts catalysts such as aluminum chloride, boron trifluoride and the like. Polymers commonly prepared by organic or inorganic free radical initiators or anionic or cationic emulsion polymerization techniques and other methods may also be used. Many such polymers are described in greater detail in "Synthetic Rubber" by G. S. Whitney, J. Wiley & Sons, Inc., New York (1954). Polymerization processes for preparing such polymers are described in detail in "Preparative Methods of Polymer Chemistry," by W. Sorenson and T. W. Campbell, Interscience Publishers, New York (1961).

The polymers employed for preparation of the modulating materials utilized can be broadly categorized as ethylenically-unsaturated polymers having average molecular weights between about 10,000 and about 3,000,000 and Wijs iodine numbers between about 1 and about 600. The unsaturation of the polymers may be in the main chain as in the case of natural rubber and synthetic elastomers such as butyl rubber prepared by head-to-tail polymerization methods or may instead be in the side chains of the polymers, as in the case of vinyl polybutyldiene and other polymers prepared by 1, 2 polymerization and in the case of polyisoprene and similar materials produced by 3, 4 addition. The ethylenically-unsaturated bonds can also be present in both the main and side polymer chains. The degree of unsaturation may vary between about 0.5 and about 99.5%. The unsaturated linkages can be conjugated, isolated, or cumulative or a mixture or combination of these structural arrangements. The polymers employed can be partially vulcanized with conventional curing agents or copolymerized with other polymerizable monomers or polymers; provided that, at the time of reaction with the metal carbonyl compound, there remains some degree of carbon-to-carbon ethylenical unsaturation within the polymer chain or molecule.

Specific examples of unsaturated polymers which are suitable for purposes of the invention include:

(1) Copolymers containing a major amount of an isoolefin and a minor amount of a multiolefin. These copolymers are commonly referred to as "butyl rubber." Their preparation and uses are described in U.S. Patent 2,356,128 to Thomas et al. Such polymers normally comprise from about 85 to about 99.5 weight percent of a $C_4$ to $C_8$ isoolefin such as isobutylene or a $C_1$ to $C_3$ alkyl substituted olefin such as 2-methyl-1-butene, and from about 0.5 to about 15.0 weight percent of a $C_4$ to $C_{14}$ multiolefin such as dimethyl allyl, a cyclic diene such as cyclopentadiene or cyclohexadiene, a conjugated diene such as isoprene or 1,3-butadiene, or a hydrocarbon-substituted conjugated diene such as dimethyl butadiene or the like. These polymers commonly have Wijs iodine numbers from 1 to 50 and from about 0.5 to about 10.0 mole percent unsaturation.

(2) Copolymers of a diene and a vinyl aromatic generally referred to as GR–S or SBR type synthetic rubbers. These are commonly made by copolymerizing about 30 to 80 weight percent of $C_4$ to $C_8$ conjugated diene such as butadiene or isoprene, a cyclic diene such as cyclopentadiene or cyclohexadiene, or an alkyl substitute diene such as dimethyl butadiene with 70 to 20 weight percent of vinyl aromatic such as styrene or dimethyl styrene or an alkyl-substituted vinyl aromatic such as divinyl benzene.

(3) Polydienes such as those produced by the homopolymerization of conjugated dienes such as butadiene, isoprene, cyclopentadiene, and the alkyl substitute derivatives of such conjugated dienes.

(4) Copolymers prepared by copolymerizing major amounts of from 50 to about 98 percent by weight of a $C_4$ to $C_8$ cyclic or straight chain diene such as butadiene, isoprene, cyclopentadiene, hexadiene or the like with a minor amount of from about 2 to about 40 weight percent of a $C_2$ to $C_6$ monoolefin such as ethylene, propylene, butylene, isobutylene, pentene or the like.

(5) Natural rubber and natural rubber latices such as those natural elastomeric products derived from latex of the Hevea and Fiscus species. These products are characterized by high unsaturations, rubber-like characteristics, and Wijs iodine numbers about 200.

The homopolymers and copolymers described above may be copolymerized further with minor amounts, generally between about 1 and about 30 weight percent, of an organic polymerizable monomer or other polymerizable polymer containing one or more vinyl, vinylene or vinylidene groups. Suitable materials include vinyl aromatics such as styrene and divinyl benzene; vinyl cyanides such as acrylonitrile and ethacrylonitrile; vinyl esters of short chain fatty acids such as vinyl acetate; long chain fatty alcohol esters of acrylic acid and $C_1$ to $C_3$ alkyl-substituted acrylic acids; halogenated vinyl compounds such as vinylidene chloride, vinyl chloride, chloroprene, ethyl dichloride; and the like.

The unsaturated polymers described above can be reacted with metal carbonyl compounds in either bulk or solution. In order to assure rapid reaction and intimate contact with the metal carbonyl with the polymer during the course of the reaction, it is preferred that the polymers be dissolved in an organic solvent. Polymers having molecular weights below about 50,000 generally have viscosities low enough to permit use of the bulk polymers; while those having high molecular weights, particularly above about 100,000 generally require solvation to obtain the desired handling and mixing characteristics.

These polymers may then be used in solvents in varying proportions. Very high molecular weight polymers such as those having molecular weights above about 200,000 are normally employed in solutions in concentrations of from about 1 to about 20 weight percent. Concentrations between about 1 and about 6 weight percent are particularly effective.

Solvents which may be employed in carrying out the reaction between the polymers and metal carbonyl compounds include aliphatic and aromatic hydrocarbons such as benzene, toluene, xylene, hexane, heptane, petroleum naphtha, cyclo hexane, and the like. Ethers such as tetrahydrofuran, 1,2-dimethyloxyethane, bis(2-epoxyethyl) ether and the like; ketones such as acetone, acetyl acetone, methylethyl ketone, methylisobutyl ketone, cyclohexanone and the like; carbon disulfide; chloroform; and mixtures of such solvents.

The basic complex unit in the polymer-carbonyl reaction product is believed to have the following structure.

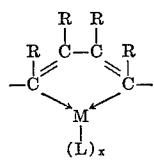

where M is the polyvalent heavy metal such as iron, nickel or cobalt; R represents the substituent group such as hydrogen or a hydrocarbon radical, particularly $C_1$ to $C_3$ alkyl group or a combination of such substituent groups; L is an electron donating ligand group bonded directly to the metal such as a carbonyl, hydrogen, hydrocarbon or similar ligand group previously discussed; and $x$ designates the number of ligand groups and, depending upon the metal and number of electrons shared by the ligand groups with the metal compound is from 1 to 4, usually 3.

The valence bonds of the polymeric complex unit, $R_4C_4ML_x$, are satisfied by one or more other polymeric complex units or by other ethylenically unsaturated or saturated hydrocarbon units within the main or side chain, such as $-(CR'_2)_n-$, $-(CR'=CR')_n-$, $$-(CR'_2CR'=CR')_n-$$

and the like wherein R' is a radical such as hydrogen or an alkyl, aryl, alkaryl, olefinic, cyclodiene or a similar group, and $n$ is a number from 1 to 10, preferably from 2 to 8. Suitable examples include the methylene, vinylene, or vinylidene radicals. The complex unit can be interspersed within the other groups of the polymer in any position, including isolated, cumulative or conjugate positions. The ends of the polymer main or side chain groups and of the complex unit where the unit is on the end of the chain are terminated with the usual terminal end group such as $CR'_3-$, $CR'_2=CR'-$ and hydrogen atoms. The exact amount and nature of the complex unit distribution within the polymer depends upon the type of polymer employed as a starting material, the degree of unsaturation before and after the reaction, and other factors which can be controlled during production of the material.

In the reaction between the polymer and the metal carbonyl compound, the isolated ethylenically-unsaturated bonds are transposed to conjugate positions. In the reaction of polybutadiene with iron carbonyl for example, the pair of bonds in two polymerized monomers is conjugated to produce the following structure.

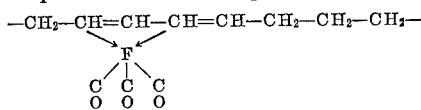

Where the unsaturated valences are satisfied by the remaining portion of the polybutadiene structure, such as $C_4H_6$ groups or multiples thereof or terminal groups such as $C_4H_7$ groups.

The polybutadiene complex may also be represented generally by the formula

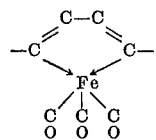

The reaction of the metal carbonyl and polymer is carried out in bulk or solution in a non-oxidizing atmosphere or under non-oxidizing conditions. The quantity of the carbonyl utilized depends in part upon the degree of unsaturation of the polymer and the desired amount of metal to be complexed with the polymer, together with the desired characteristics of the polymer and its proposed use. The maximum quantity of the metal carbonyl that can be complexed with the polymer can be determined stoichiometrically by the degree of the polymer unsaturation, since each pair of carbon-to-carbon ethylenically-unsaturated bonds is capable of complexing one mole of metal carbonyl. The reaction can be carried out with less than the stoichiometric quantity of the metal carbonyl and may take place in situ during the polymerization, copolymerization, or dehydrogenation of a polymer or its monomers. The metal carbonyl concentration in general should exceed 10% by weight or catalytic quantities, since amounts less than this are normally ineffective to form a complexed polymer suitable for purposes of the invention. The preferred amount of metal carbonyl based on the weight of the monomeric polymer unit or copolymer unit in the polymer will normally exceed 50% by weight and is generally in the range of from 100 to 800% by weight or higher. The concentration limit can also be expressed in terms of the number of moles of metal carbonyl present per mole of ethylenical unsaturation in the polymer. At least 0.15 mole per mole should normally be used. From about 0.25 to about 2.50 or more moles per mole is generally preferred. The quantity of metal carbonyl and metal complexed with the polymer can be determined by analysis of the infrared spectrum of polymer samples or by conventional combustion techniques.

The reaction between the carbonyl and the polymer to form the complex material proceeds over a wide range of temperatures. Temperatures between about 30° and about 150° C. may be employed but those in the range between about 80° and about 130° C. are generally preferable. At low temperatures, the reaction proceeds without significant degradation of the polymer molecular weight. As the reaction temperature is increased, depolymerization of the polymer takes place. The reaction may be carried out at elevated temperatures with the polymer in bulk or in solution in hydrocarbon solvents if degradation is not important. Where it is desired to maintain the molecular weight, the reaction is preferably carried out in solvent solutions containing polymer protective solvents.

The time for completion of the complex reaction depends upon the reaction temperature, the metal carbonyl utilized, and other preselected reaction conditions. It may range from about 1 hour to about 72 hours. In general the reaction is normally completed in from 2 to 6 hours at temperatures above 70° C. Gelation and polymerization of the polymer during the reaction are normally prevented by employing a blanket of inert gas such as nitrogen, helium, carbon monoxide, a rare gas, or the like over the polymer after the reaction zone or vessel has been swept clear of air or oxidizing compound and gases. The reaction proceeds at atmospheric pressure but may in general be carried out at pressures within the range between about 0.1 and about 10 atmospheres or higher. A productive organic solvent may be employed alone or with a hydrocarbon polymer solvent in carrying out the reaction. This reduces molecular weight degradation of the polymer at elevated temperatures. Polar solvents having greater polarity than hydrocarbons and less polarity than acids, acid dehydrides, and acid chlorides may be employed. The saturated organic solvents containing carbon, hydrogen and oxygen and one or more ketone, ether or hydroxyl groups are preferred. The protective solvent employed should be wholly or partially miscible with the unsaturated polymer or polymer solution and in some cases may function as both the polymer solvent and the protective solvent. Materials which may be used in this manner include 1,3-dialkoxyalkanes such as 1,3-dimethoxyethane. When employed in combination with a hydrocarbon solvent, the protective solvent normally comprises from about 5 to about 50% of the solution. Polar solvents which may be employed in preparing the complex include the substituted and unsubstituted, saturated and unsaturated, $C_1$ to $C_{30}$ aliphatic, alicyclic, aromatic, heterocyclic and alkyl-aromatic solvents such as cyclohexanol, methanol, ethanol, tertiary butanol, benzyl alcohol, propylene glycol, hexylene glycol, acetone, cyclohexanone, methylethyl ether, phenyl ether, benzaldehyde, acetaldehyde, benzylacetate, tertiary butyl acetate and mixtures and combinations thereof.

The preparation of the polymeric complexes and metal-containing polymers can be aided if desired by the use of high energy and actinic radiation. Gamma radiation or ultraviolet radiation in the range between about 1850 and 5500 angstroms may be used alone or in combination to effect reaction of the metal carbonyl and polymer.

An effective process for initially forming the polymer comprises the addition of a polybutadiene or similar unsaturated polymer to a solution containing a hydrocarbon solvent and polar solvent, sweeping of the reaction vessel with hydrogen to remove air, adding an iron or other metal carbonyl to the polymer solution, heating the solution to a temperature between about 73° C. and about 130° C. and subsequently recovering the complex polymer by precipitating it in a polar solution in which the polymer is insoluble, such as a solution of aliphatic alcohol and hydrochloric acid or a similar strong acid.

The metallic polymers prepared as described above can be heated to elevated temperatures in order to obtain products having magnetic properties. The heating is carried out at temperatures in excess of 100° C., preferably between about 150° C. and about 1,000° C., for a period sufficient to obtain the magnetic properties. At relatively high temperatures, a period of from about 10 minutes to about 1 hour will normally be required; whereas from a period of from about 1 to about 5 hours is generally necessary at lower temperatures in the range between about 200° C. and about 500° C. After heating, the polymers exhibit magnetic properties and will respond to magnetic fields without separation of the magnetic components. In other words, the heated polymers demonstrate induced magnetism when placed in a magnetic field. The heating effects the formation of small, finely-divided metal or metal oxide crystals along the polymer chain. These crystals are apparently intertwined along the chain and are not separated by ordinary magnetic separation methods. They commonly have an average cluster or particle size of from about 10 to about 150 angstroms. The growth and ultimate size of the crystals and hence their magnetic properties are dependent in part upon the range of heating. The quantity of induced magnetism generally increases with time and temperature to an optimum point.

The heat treatment of the metal complexed polymer can be carried out with solid or rubbery complex elastomers or with hydrocarbon solutions of the polymer. Heat treatment of the rubbery metal complexed elastomer either alone or in combination with other elastomers produces a dark colored solid or plastic capable of being ground into a dispersible, finely-divided powder having magnetic properties. The metal complexed polymer can also be dissolved in a solvent or employed in the form of a slurry in a non-solvent and heat treated at 100 to 200° C. to provide liquid solutions and slurries exhibiting magnetic properties. Since a liquid or slurry is generally employed for purposes of the invention, it is preferable that the heat treatment be carried out in the presence of additional metal carbonyl. Either the same or a different metal carbonyl than that used to prepare the complex polymer may be employed. The addition of from about 100 to about 1,000 weight percent of excess metal carbonyl in the solvent or slurry promotes effective formation of magnetic properties in the polymer.

In lieu of heating the complexed polymer as described above, the polybutadiene or other polymeric starting material can be reacted with an excess of iron carbonyl or the like in the presence of a magnetic field to obtain the desired magnetic polymer. The field employed should be somewhat stronger than the earth's magnetic field and will generally be between about 2 and about 10,000 oersteds preferably between about 10 and about 1,000 oersteds. The field may be either stationary or moving and may be constant or pulsating. It can be applied for a period of from about 10 minutes to an hour or longer at any time during the reaction, preferably toward the end of the reaction, or may be instead applied during the entire reaction. The use of large excesses of carbonyl and long reaction periods is particularly effective in this procedure. Studies have shown that the inclusion of from about 9 to about 200 parts, preferably from about 40 to about 150, of carbonyl by weight per part of polymer and reaction periods from about 15 to about 120 hours, preferably from 24 to 96 hours, results in longer chains containing the metallic particles and more pronounced magnetic properties. The structural unit thus formed, when iron carbonyl is used, can be represented by the formula

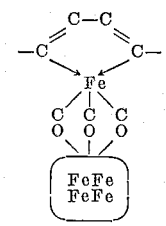

It will be noted that the above structure contains several additional iron molecules arranged in a cluster on the inner iron carbonyl group. The iron molecules making up these "clumps" form the long chain previously mentioned in the presence of a magnetic field and are apparently responsible for the superior magnetic properties of the material produced in this manner.

An alternate procedure for preparing the material containing the metallic "clump" is to first prepare the hydrocarbon polymer-carbonyl complex as described earlier and then react this material with excess carbonyl of the same or a different metal in the presence of a magnetic field. A solution of the complex in a solvent may be heated at a temperature between about 100 and about 300° C. for a period of from about 12 to about 120 hours with the excess carbonyl under an inert atmosphere in carrying out the second reaction. The carbonyl can be added all at once or divided into several portions and added at intervals of several hours during the reaction period. The resultant liquid product contains a solution of the polymer and highly dispersed metal which is nonseparable under a strong magnetic field. The solid particle can be recovered from the solvent and unreacted carbonyl by vacuum distillation at room temperature. The solid product will generally contain 30 to 75 weight percent metal, although the metal content can be held at a lower level if desired.

The magnetic material can be prepared in a liquid form initially or can instead be vulcanized or solidified and later dissolved or slurried in a suitable solvent to provide a liquid having magnetic properties. The use of colorless solvents improves the light transmissibility of the magnetic material and is generally preferred. Material may be diluted with 150 parts or more of the solvent, depending in part upon the length of the radiation path through the material. Where no solvent is used, a very thin film of the polymer about 0.1 millimeter in thickness will normally be employed. With a solvent-to-magnetic polymer ratio of 150:1, on the other hand, a relatively thick film or layer of the polymer may be used.

The improved modulation cell in which the magnetic polymer described above is utilized in accordance with the invention is shown in FIGURE 1 of the drawing. As depicted, this cell comprises two sheets 11 and 12 of glass, plastic or similar material through which the electromagnetic radiation to be modulated may pass. The material from which the sheets are constructed will normally be transparent but, where infraphotic radiation is used, may be translucent or opaque with respect to light in the visible spectrum. The inner surface of one or both of the sheets is recessed about 0.1 millimeter or more to provide a cavity within which a thin film of the magnetic polymer may be placed and permit bonding of the sheets together at their outer edges by means of a suitable adhesive. In lieu of this, a gasket may be bonded between the sheets along their outer edges to provide the required cavity. A single sheet containing a slit which can be filled with the polymer and then sealed may also be used in certain instances.

Sheets 11 and 12 in the cell on FIGURE 1 will normally be flat sheets of uniform thickness mounted parallel to one another to provide a uniform polymer film. This permits substantially uniform modulation of the radiation passing through the cell with apertures 24 or more inches in size. In some instances, however, the sheets may be mounted in a nonparallel relationship so that the thickness of the polymer film increases from one edge to the other, thus permitting a variation in modulation across the face of the cell. This will generally require variation in the spacing of the conductor segments, as will be pointed out later. The inner walls of the cavity may also be of concave or convex cross-section so that the amount of modulation obtained varies from the center of the cell to the outer edges. The entire cell may be curved where particular effects are desired or where transmission in a plane is necessary. The sheets may be square, rectangular, circular or of any other desired configuration.

The polymeric film 13 contained in the cavity between plates 11 and 12 of the cell may consist of undiluted polymer or may be a solution of the polymer in a suitable solvent. The form in which the polymer is employed will depend upon the particular type of electromagnetic radiation to be modulated with the cell and the extent to which transparency is required. The undiluted polymer is generally of dark color and hence light in the visible spectrum may be diminished considerably in passing through a relatively thin film. The use of a solvent containing the polymer results in a more nearly transparent film and is generally preferred where photic radiation is employed. The thickness of the film, as pointed out above, may range from a few hundredths of a millimeter to a millimeter or more.

The cell of the invention is characterized by separate modulation and bias windings. The windings may be insulated or bare, depending on the environment in which the cell is to be used. The modulation winding, indicated by reference numeral 14, extends from an input terminal 15 at one edge of the cell to an output terminal 16 at the other edge. The bias winding 17 extends between input terminal 18 and output terminal 19. These windings, normally formed from single conductors of copper, aluminum or the like, form two separate helices which extend about the entire cell. Segments of the windings extend parallel to one another on the outer surfaces of plates 11 and 12. This external placement simplifies the dissipation of heat generated by the modulating and bias currents and avoids degradation problems which may be encountered if the coils are immersed in the polymer itself. Difficulties in providing the leak-proof seals between the conductors and cell necessary to avoid the loss of volatile solvents when an immersed conductor is used are avoided. This construction also results in a rugged cell which is easy to fabricate and is essentially maintenance free. In lieu of placing the winding on the outer surface of plates 11 and 12 as shown, they may be recessed in slots in the plates if desired.

Figure 2:
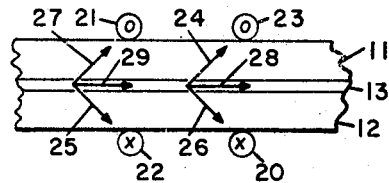
FIGURE 2 is a partial cross-section through the cell of FIGURE 1, enlarged to indicate the direction of the magnetic field when the modulating current and bias current flow in the same direction.
Figure 3:
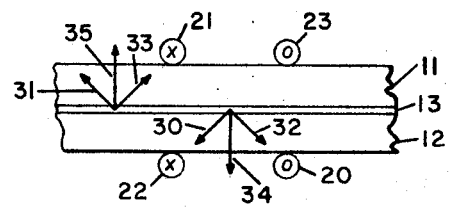
FIGURE 3 is a partial cross-section through the cell of FIGURE 1, enlarged to indicate the direction of the magnetic field when the modulating current and bias curent flow in opposite directions.

The placement of the modulation and bias windings to secure a substantially uniform magnetic field is illustrated in FIGURES 2 and 3 of the drawing. FIGURE 2 is an enlarged fragmentary cross-section taken through the cell of FIGURE 1 along a plane parallel to the upper edge of the cell. As shown, the segments making up the modulation winding and those in the bias winding are alternately spaced along the outer surfaces of plates 11 and 12 on either side of the polymeric film 13. Segments 20 and 21 are part of the modulation winding. Conductor segments 22 and 23 are part of the bias winding. The distance between adjacent conductors in a plane parallel to the film is approximately the same as the distance between conductors across the film. This "square" spacing of the segments produces modulating and bias fields at 90° to one another and is normally preferred. In some cases, however, particularly where the outer surfaces of plates 11 and 12 are not parallel, other spacing arrangements may be utilized. The crosses at the centers of segments 20 and 22 indicate current flow into the paper. The circles at the centers of segments 21 and 23 indicate that current flow is out of the paper. The modulating and bias currents in the cell represented in FIGURE 2 are thus flowing in the same direction relative to the front and rear surfaces of the cell. The electromagnetic field produced by the modulating current is represented by vectors 24 and 25. Vectors 26 and 27 represent the field produced by the bias current. The resulting magnetic field acting on the film of magnetic polymer is parallel to the plane of the film as shown by resultants 28 and 29 in FIGURE 2. This causes the magnetic particles in the polymer to line up perpendicular to the direction in which light or other radiation is propagated through the cell and increases attenuation of the beam. Maximum attenuation can be obtained in the visible spectrum by utilizing polarized light but this is not essential in most applications.

In FIGURE 3 of the drawing, the direction of the modulating current has been reversed. The modulating current flows into the paper through conductor 21 and leaves the paper through conductor 20, producing a magnetic field as indicated by vectors 30 and 31. The bias current, flowing into the paper through conductor 22 and leaving through conductor 23 produces a bias field in the direction shown by vectors 32 and 33. The resultant of these two fields is perpendicular to the plane of the polymeric film as indicated by vectors 34 and 35. This permits maximum transmission of light or other radiation through the cell, regardless of the state of polarization of the incident radiation.

In the discussion of FIGURES 2 and 3 of the drawing, it has been assumed that the modulating current and bias current are both of the same amplitude. This will normally be the situation where either maximum or minimum transmission of a given beam of radiation is required. By alternating the direction of the modulating current so that the transmission characteristics of the cell are shifted from a maximum to a minimum or vice versa, pulse modulation of the beam can be achieved. The cell shown is not, however, limited to this mode of operation. Linear amplitude modulation may be employed by utilizing a variable modulating current. As long as this variable modulating current does not exceed the amplitude of the bias current, the intensity of the radiation transmitted through the cell will vary, about the intermediate level set by the bias current, in an amount proportional to the amplitude of the modulating current. This latter mode of operation will normally be employed in voice modulated search light communicators, beacons, and other systems utilizing linear amplitude modulation.

The cell illustrated in FIGURES 1 through 3 of the drawing requires only moderate currents to secure essentially uniform modulation over large apertures. It has been found that a current of 5 amperes through No. 18 wires spaced so that the distance between segments is equal to the wire diameter will produce a 20 gauss magnetic field in the polymer film and that this will permit satisfactory modulation of light passing through the film. The field thus produced does not vary at any point in the field more than about 15% from the value at the center point and does not vary from the expected orientation more than about 12½°. Other modulating systems, on the other hand, give variations in field intensity of 40% or more and are thus much less satisfactory than the cell of the invention.

Figure 4:
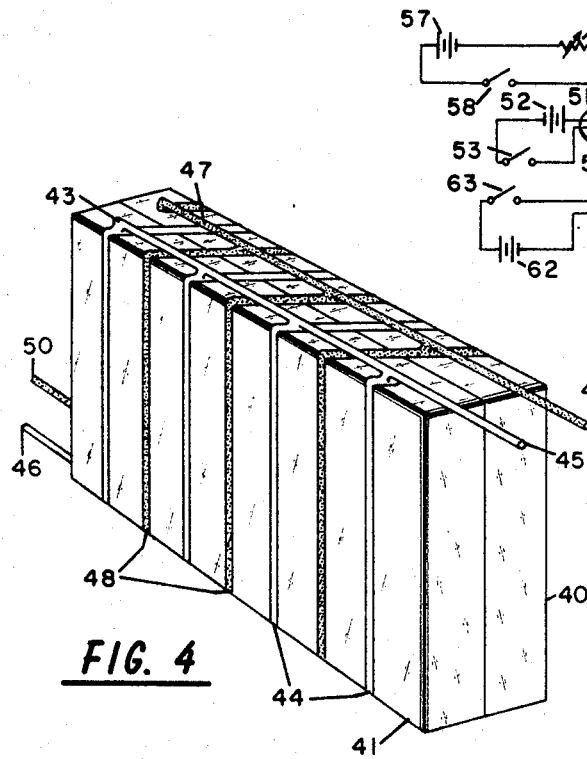
FIGURE 4 is an isometric drawing of an alternate embodiment of the invention utilizing printed circuits and parallel conductors.

FIGURE 4 of the drawing illustrates an alternate embodiment of the invention in which printed circuits and parallel conductors are utilized. The cell shown in FIGURE 4 includes plates 40 and 41 of plastic or similar material through which light or other electromagnetic radiation may pass. A thin film of the magnetic polymer, which does not appear in the drawing, is interposed between the two plates as in the earlier embodiment. Printed circuits applied to the outer surfaces of the plates by conventional methods form separate modulating and bias windings. The modulating winding includes a buss 43 at the upper edge of the cell, parallel conductor segments 44 extending downwardly over the front and rear surfaces, and a buss on the lower edge of the cell which is not shown. The busses are soldered to the printed circuit components and may be connected to an external modulating circuit at points 45 and 46. The bias winding includes upper buss 47, parallel conductor segments 48 which extend downwardly on the front and rear surfaces of the cell between the modulating conductor segments, and a lower buss not shown in the drawing. The busses may be connected to an external bias circuit at points 49 and 50. The spacing between the conductor segments may be similar to that in the earlier embodiment. The cell depicted is intended for use with radiation in the visible and near infrared regions but may be employed with radiation of longer wave-lengths, so long as the spacing between segments is large with respect to the particular wave-length employed. This use of conductor segments connected in parallel rather than in series further reduces the voltage requirements of the cell but increases the current necessary to achieve a magnetic field of given strength.

The cells described above are based on the modulation of light or other radiation passing perpendicular to the plane of the magnetic polymer film and are therefore intended for operation with substantially parallel radiation beams. If a light source which does not produce a parallel beam is employed, thin plastic Fresnel lenses of large aperture may be utilized in lieu of ordinary plates to create a parallel beam for passage through the film. The apparatus can also be employed with polarized light as mentioned earlier, in which case the polarizer can be incorporated as one plate of the cell. Although the system shown has particular advantages for use where large apertures are required, it may also be employed with smaller aperture devices utilizing lasers and other high intensity light sources.

Figure 5:
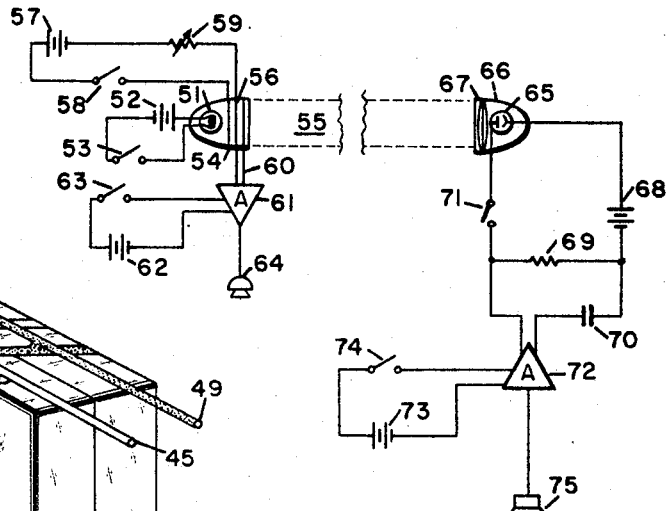
FIGURE 5 is a schematic diagram illustrating use of the improved cell in a communications system.

FIGURE 5 of the drawing illustrates a typical application of the improved cell of the invention in an audio communication system. The apparatus shown includes a transmitter containing a light source 51 powered by a battery 52 connected to the source through switch 53. The light source, which may be an ordinary incandescent bulb, is mounted in a parabolic reflector 54 with the filament at the focus of the reflector so that a substantially parallel beam of light is transmitted from the reflector along path 55. A circular cell 56 containing a thin film of the magnetic polymer interposed between two transparent sheets of glass or plastic is mounted in the end of the reflector in front of the light source. The modulating and bias windings of the cell are not shown in FIGURE 5 but may be generally similar to those shown in FIGURES 1 through 4. The bias circuit is powered by battery 57 connected through switch 58. Variable resistor 59 permits variation of the bias current as desired. The modulating circuit is connected by leads 60 to amplifier 61. The amplifier, which may be of conventional design, is powered by battery 62 through switch 63. Microphone 64 is connected to the amplifier so that pulsations generated by speaking into the microphone create a pulsating electrical current in the modulating circuit of the cell. The interaction of the magnetic fields produced by the modulating and bias windings results in modulation of the light passing through the cell so that it corresponds to the microphone signal.

The receiver in the apparatus of FIGURE 5, which may be located at a considerable distance from the transmitter, includes a photocell 65 positioned in a housing 66. The housing is fitted with a lens 67 for focusing radiation from beam 55 onto the sensitive portion of the photocell. The photocell employed may be a photoconductive device such as a selenium cell, a photoemissive device in which an emission of electrons occur in a vacuum or across a gas-filled space such as an alkali cell, or a photovoltaic cell depending on contact between a metal and a semi-conductor such as a rectifier cell. Bias battery 68, resistor 69 and capacitor 70 are provided for operation of the photoelectric cell. Switch 71 activates the circuit. An amplifier 72, powered by battery 73 through switch 74, is provided for amplification of the photoelectric cell signal. The output signal from the amplifier is fed to a speaker or a similar reproduction device 75. The modulated light beam detected by the photoelectric cell is amplified by the associated circuitry and converted into an audio signal by the speaker. Apparatus of this type requires little power, can be built with transistorized circuits, and can therefore be made readily portable. Such apparatus is particularly useful in military communications where the information transmitted must not be jammed or picked up by other parties but has many other potential applications.

The apparatus shown in FIGURE 5 of the drawing utilizes linear amplitude modulation. Other modulating systems may be employed. In addition to the on-off pulse modulation referred to earlier, other standard pulse modulation techniques in which either the height, duration, or repetition rate of the pulses carries the information to be transmitted can be used. A further modification involves the application of properly phased signals to both the bias and modulating windings in order to generate a pseudo-rotating magnetic field and thus produce other types of modulation. These and other modifications of the invention will readily be apparent to those skilled in the art.

What is claimed is:
1. A radiation beam modulation cell comprising:
   (a) a container through which a beam of electromagnetic radiation of preselected characteristics may be passed;
   (b) a magnetic polymer sealed within said container in the path of said beam of radiation, the radiation transmissibility of said polymer varying with changes in the magnetic field to which the polymer is subjected;
   (c) a modulating winding including segments extending substantially perpendicular to the path of said beam of radiation and parallel to one another in front of and behind said container; and
   (d) a bias winding including segments extending substantially perpendicular to the path of said beam of radiation and parallel to one another between the segments of said modulating winding in front of and behind said container.

2. A cell as defined by claim 1 wherein said modulating and bias windings are helical windings surrounding said container.

3. A cell as defined by claim 1 wherein said modulating winding and said bias winding include parallel conductors connected between busses extending along the edges of said container.

4. A radiation beam modulation cell comprising:
(a) a container through which a beam of electromagnetic radiation of preselected characteristics may be passed;
(b) a transverse film of magnetic polymer sealed within said container in the path of said beam of radiation, said magnetic polymer comprising a hydrocarbon-Group VIII, Series 4, metal carbonyl complex characterized by changes in radiation transmissibility with changes in the magnetic field to which said polymer is subjected;
(c) a modulating winding extending about said container, said modulating winding including segments extending substantially parallel to said film and to one another at spaced intervals along the front and rear surfaces of said film; and
(d) a bias winding extending about said container, said bias winding including segments extending substantially parallel to said film and to one another at spaced intervals along the front and rear surfaces of said film between the segments of said modulating windings.

5. A cell as defined by claim 4 wherein the distance between adjacent segments along the front and back of said film is approximately the same as the distance between adjacent segments through said film.

6. A cell as defined by claim 4 wherein said container comprises two parallel sheets of radiation transparent material sealed together along their edges.

7. A cell as defined by claim 4 wherein said segments of said modulation and bias windings are printed on the surfaces of said container.

8. A cell for modulating radiation in the visible and infrared spectrum which comprises:
(a) a container including a transparent aperture through which a beam of electromagnetic radiation in the visible and infrared spectrum may be passed;
(b) a magnetic polymer retained in said container in the path of said beam of radiation, said magnetic polymer comprising a hydrocarbon-group VIII, Series 4, metal carbonyl complex characterized by changes in the transmissibility of radiation in the visible and infrared spectrum with changes in the magnetic field to which said polymer is subjected;
(c) a modulating coil surrounding said container, said modulating winding including conductor segments extending at substantially right angles to the radiation beam path through said aperture and extending substantially parallel to one another at spaced intervals across said beam path in front of and behind said aperture; and
(d) a bias coil surrounding said container, said bias coil including conductor segments spaced between said modulating coil segments and extending substantially parallel to said modulating coil segments.

9. A cell as defined by claim 8 wherein said magnetic polymer is a complex formed from butadiene and an iron carbonyl.

10. A cell as defined by claim 8 wherein said magnetic polymer is contained in a solvent.

11. A cell as defined by claim 8 including a polarizer located in said radiation beam path in front of said magnetic polymer.

12. A cell as defined by claim 8 including a Fresnel lens located in said radiation beam path in front of said magnetic polymer.

13. Apparatus for modulating a beam of radiation in the visible and infrared spectrum which comprises:
(a) a container including a transparent aperture through which said beam of radiation may be passed;
(b) a liquid solvent containing a ferromagnetic-hydrocarbon polymer complex formed by the reaction of an unsaturated hydrocarbon polymer with an excess of a Group VIII transition metal carbonyl located within said container in the path of said beam of radiation, the transmissibility of radiation through said solvent varying in response to changes in the magnetic field to which said complex is subjected;
(c) a modulating winding including substantially parallel conductor segments spaced at intervals across the path of said radiation beam in front of and behind said aperture;
(d) means for applying a pulsating electrical current to said modulating winding;
(e) a bias winding including substantially parallel conductor segments spaced at intervals across the path of said radiation beam in front of and behind said aperture, each bias winding conductor segment being located between two adjacent modulating winding conductor segments; and,
(f) means for applying a variable electrical current to said bias winding.

14. Apparatus as defined by claim 13 wherein said solvent containing said complex is present in said container as a thin film of substantially uniform thickness extending across the path of said beam of radiation.

References Cited

UNITED STATES PATENTS

| | | | |
|---|---|---|---|
| 2,953,819 | 9/1960 | Holoubek et al. | 296—97 |
| 3,169,163 | 2/1965 | Nassenstein | 350—160 |
| 3,245,313 | 4/1966 | Zaromb | 350—160 |

JEWELL H. PEDERSEN, *Primary Examiner.*

W. L. SIKES, *Assistant Examiner.*